(12) United States Patent
Akaike et al.

(10) Patent No.: US 10,299,026 B2
(45) Date of Patent: *May 21, 2019

(54) INPUT DEVICE

(71) Applicant: Sony Corporation, Tokyo (JP)

(72) Inventors: Kazuhiro Akaike, Kanagawa (JP);
Takahiro Muraguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 222 days.

This patent is subject to a terminal disclaimer.

(21) Appl. No.: 14/453,541

(22) Filed: Aug. 6, 2014

(65) Prior Publication Data

US 2014/0348341 A1 Nov. 27, 2014

Related U.S. Application Data

(63) Continuation of application No. 13/239,849, filed on Sep. 22, 2011, now Pat. No. 8,842,850.

(30) Foreign Application Priority Data

Oct. 1, 2010 (JP) ................................ 2010-223502

(51) Int. Cl.
H04M 1/05 (2006.01)
H04R 1/10 (2006.01)
H04M 1/60 (2006.01)
H04R 5/033 (2006.01)

(52) U.S. Cl.
CPC ............ *H04R 1/1041* (2013.01); *H04M 1/05* (2013.01); *H04M 1/6066* (2013.01); *H04M 2250/02* (2013.01); *H04R 1/1083* (2013.01); *H04R 5/033* (2013.01)

(58) Field of Classification Search
CPC .............. H04R 1/1041; H04R 2420/07; H04R 2430/01; H04M 1/05; H04M 1/6066; H04M 1/6058; H04M 1/7253
USPC ......................................... 381/74; 455/575.2
See application file for complete search history.

(56) References Cited

U.S. PATENT DOCUMENTS

| 5,721,775 | A | 2/1998 | Leifer | |
| 7,800,044 | B1 * | 9/2010 | Kahn ..................... | G06F 1/3287 250/214 AL |
| 8,842,850 | B2 * | 9/2014 | Akaike ................. | H04R 1/1041 381/309 |
| 2007/0184881 | A1 * | 8/2007 | Wahl ....................... | H04M 1/05 455/575.2 |

(Continued)

FOREIGN PATENT DOCUMENTS

| JP | 2001-272628 A | 10/2001 |
| JP | 2005-122271 A | 5/2005 |

(Continued)

*Primary Examiner* — Alexander Jamal
(74) *Attorney, Agent, or Firm* — Wolf, Greenfield & Sacks, P.C.

(57) ABSTRACT

An input device of an electronic apparatus including an input detection unit which is provided on the electronic apparatus at a position that is difficult to be seen by a user who uses the input device, and which detects an input operation of the user; a movement distance detection unit that detects a movement distance of an input position over the input detection unit; and an action control unit that controls a predetermined action of the electronic apparatus based on the movement distance detected by the movement distance detection unit.

16 Claims, 8 Drawing Sheets

(56) References Cited

U.S. PATENT DOCUMENTS

| | | | |
|---|---|---|---|
| 2007/0274530 A1 | 11/2007 | Buil et al. | |
| 2008/0056525 A1* | 3/2008 | Fujiwara | H04R 1/1033 381/374 |
| 2008/0080704 A1* | 4/2008 | te Riet | H04R 1/1066 379/430 |
| 2008/0130910 A1* | 6/2008 | Jobling | G06F 3/03547 381/74 |
| 2012/0014553 A1* | 1/2012 | Bonanno | H03G 3/341 381/364 |
| 2012/0082321 A1 | 4/2012 | Akaike et al. | |
| 2012/0114131 A1* | 5/2012 | Tricoukes | H04R 1/105 381/74 |
| 2014/0169582 A1* | 6/2014 | Brown | H04R 1/1041 381/74 |
| 2014/0233753 A1* | 8/2014 | Waldman | H04R 1/1041 381/74 |

FOREIGN PATENT DOCUMENTS

| | | |
|---|---|---|
| JP | 2007-310599 A | 11/2007 |
| JP | 2008-252496 A | 10/2008 |
| JP | 2010-191574 A | 9/2010 |

\* cited by examiner

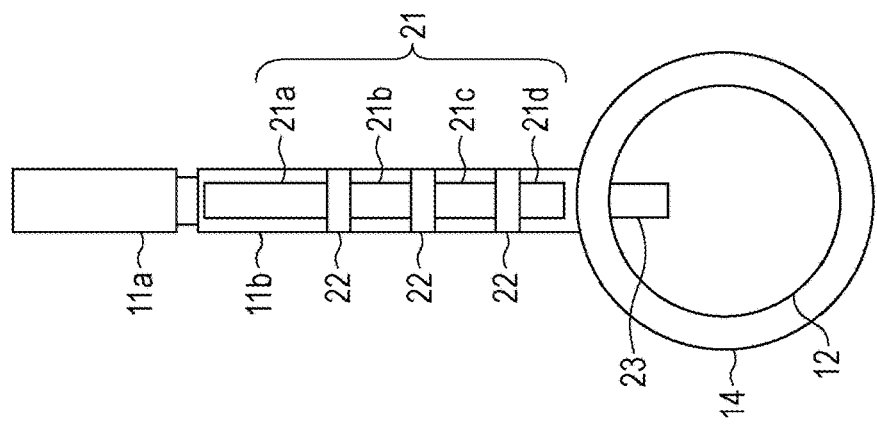
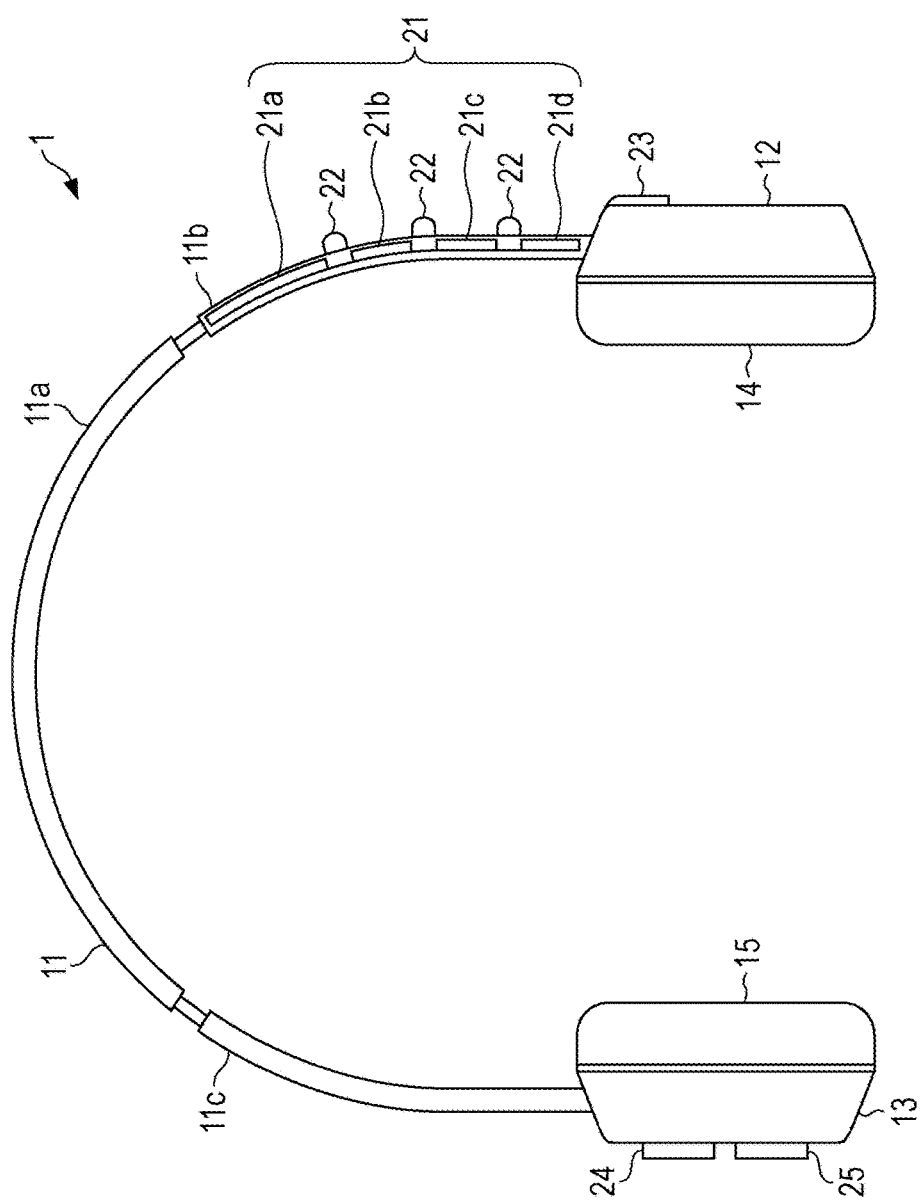

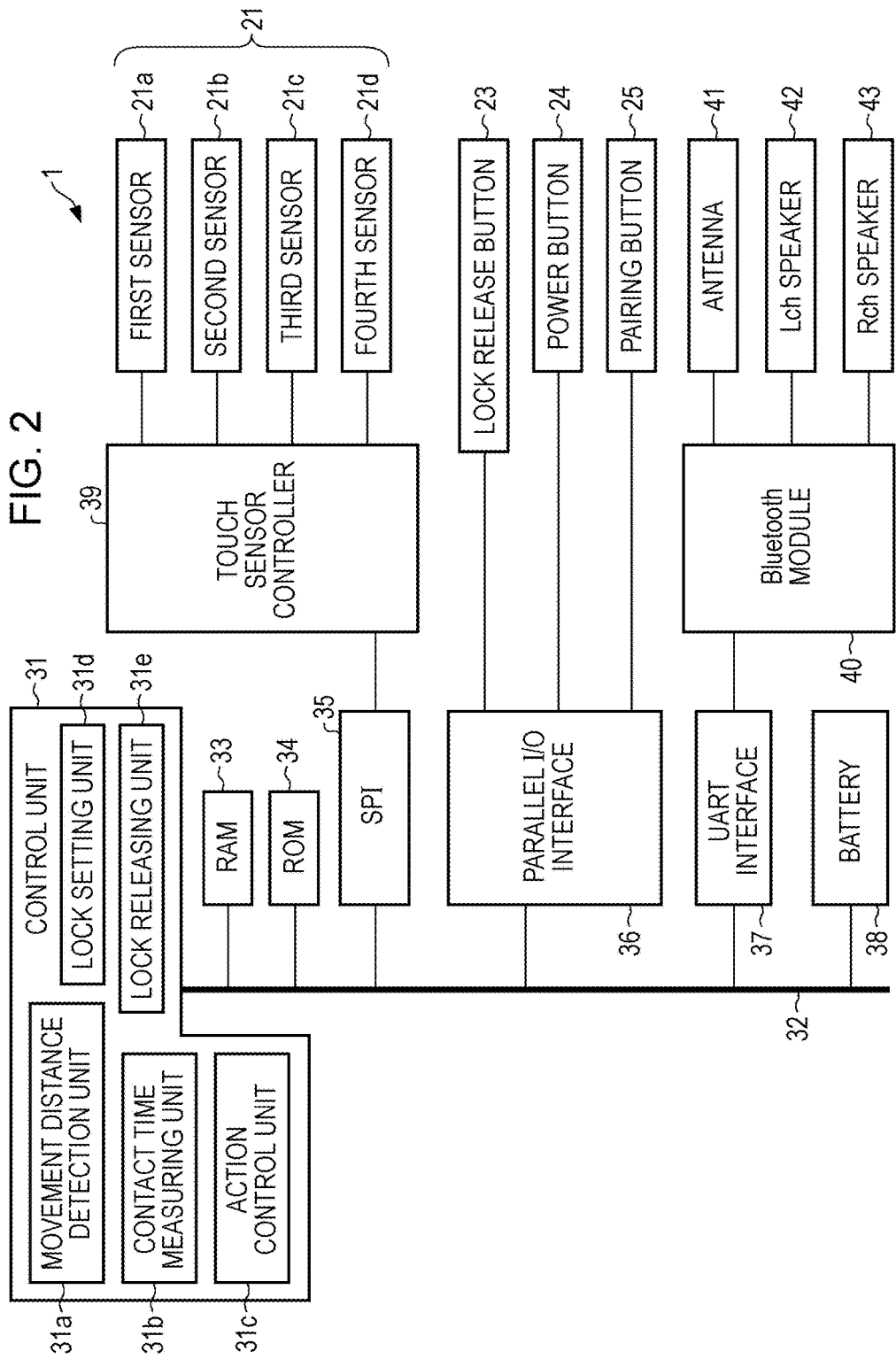

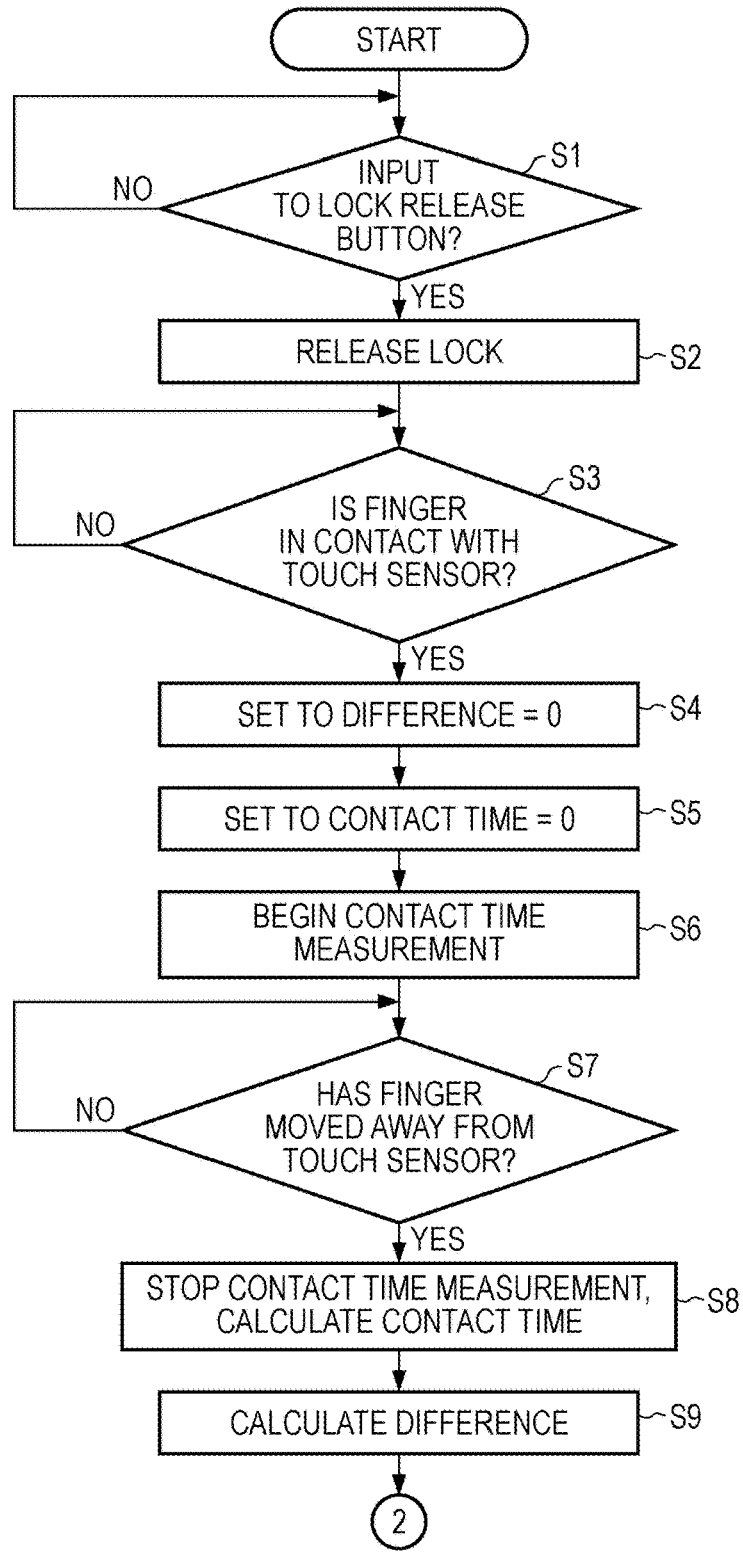

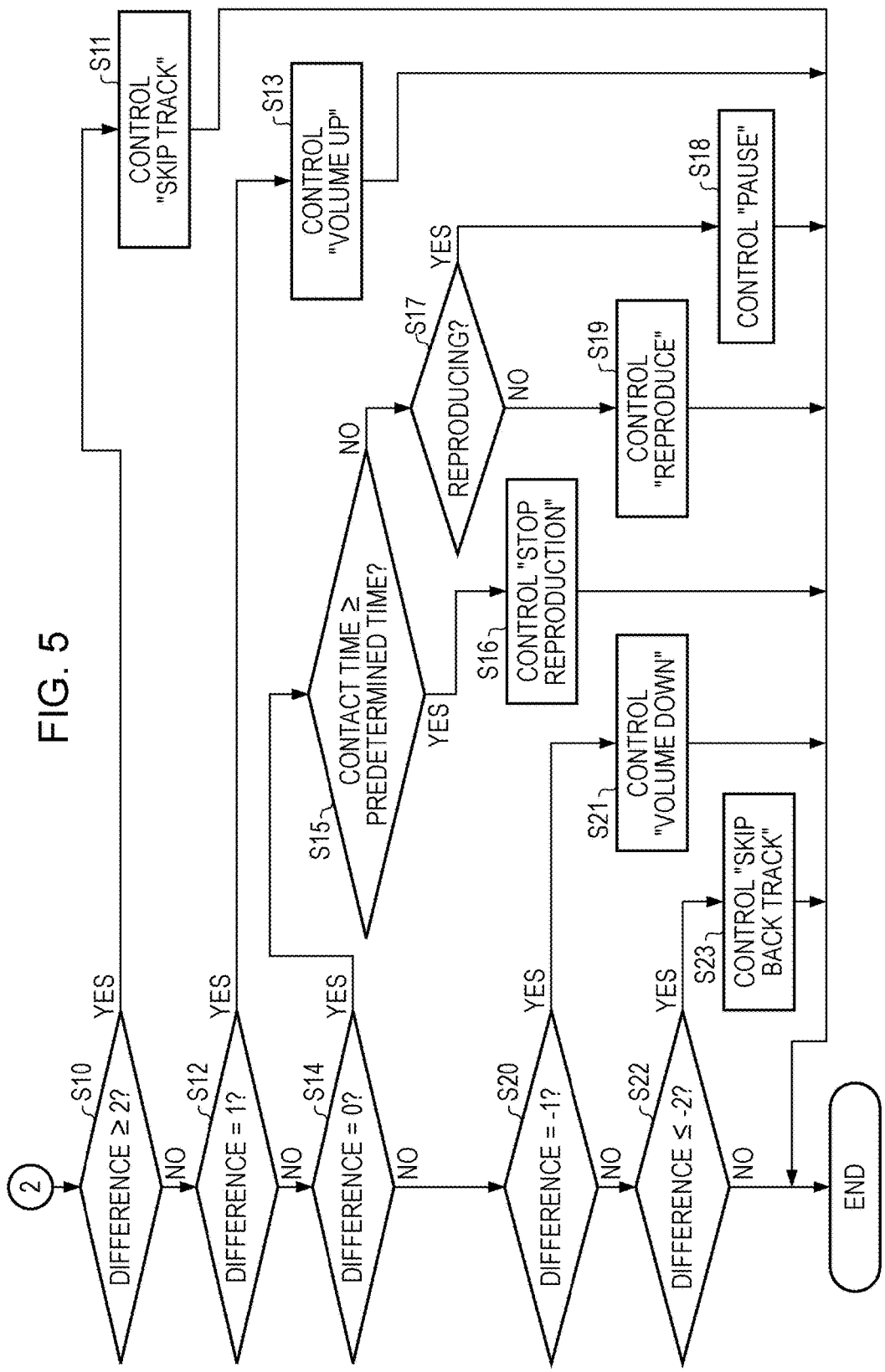

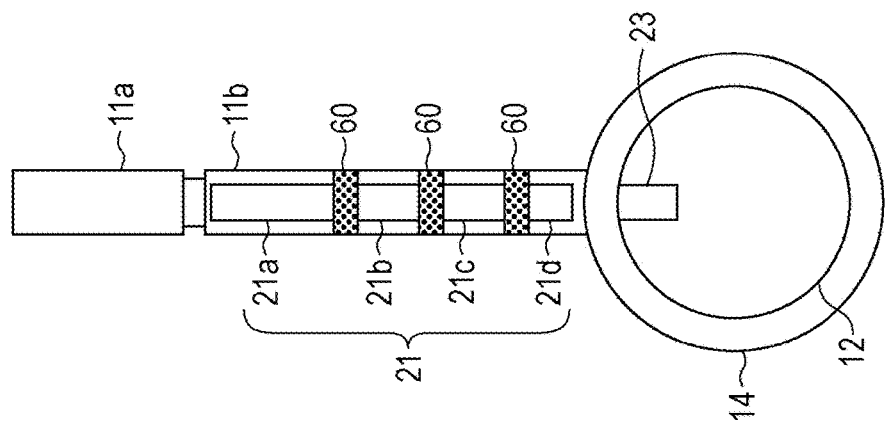
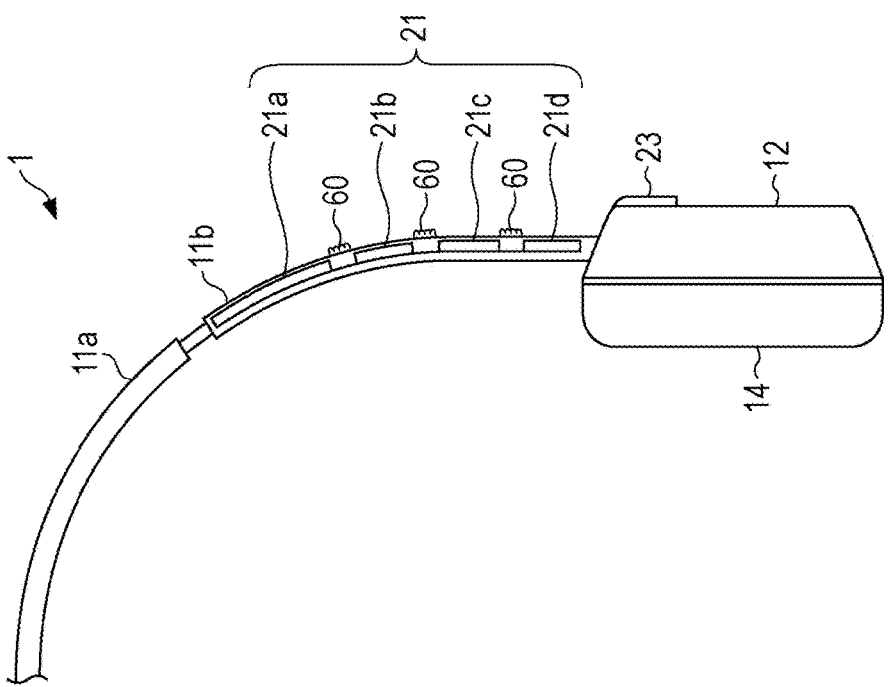

INPUT DEVICE

CROSS REFERENCES TO RELATED APPLICATIONS

This application is a continuation of U.S. patent application Ser. No. 13/239,849, entitled "INPUT DEVICE," filed on Sep. 22, 2011, which claims priority under 35 U.S.C. § 119 to Japanese Patent Application JP 2010-223502, filed on Oct. 1, 2010. Each of the foregoing documents is incorporated by reference in its entirety.

BACKGROUND

The present disclosure relates to an input device, and in detail, the disclosure relates to an input device in which a user is able to easily perform input without having to look.

In recent years, with electronic apparatuses such as mobile phones, game consoles, and music players, devices referred to as touchpads and touch sensors have been widely adopted as input devices to receive input operations by users. With such touchpads and the like, since a user performs input by directly contacting an input surface with their own fingers or a pen for inputting that is generally referred to as a stylus, a more intuitive input is possible as compared to an input operation by so-called physical buttons.

A mobile information apparatus including such a touchpad has been proposed (Japanese Unexamined Patent Application Publication No. 2008-252496). With the mobile information apparatus described in Japanese Unexamined Patent Application Publication No. 2008-252496, the touchpad is configured to include a plurality of soft keys, and various input operations are able to be performed on the mobile information apparatus by contacting the positions of the soft keys with a finger or the like.

SUMMARY

Since soft keys are not formed in a protruding form unlike physical keys, it is not possible to determine the positions of soft keys by feeling with a finger when inputting. Further, since soft keys do not depress when inputting as physical buttons do, a user is not able to verify whether an input has been made correctly by the feel of the finger. Therefore, the user is not able to judge, when performing input, whether or not their finger or the like accurately coincides with the position of a soft key without looking. Consequently, in order to perform an input, it may be necessary that the user verifies the position of the touchpad, the position of soft keys, and the like by looking constantly.

On the other hand, there are also apparatuses in which input devices are provided in positions that are not able to be seen. Headphones in which an input device is provided on housings or the headband are given as an example. When the headphones are equipped, since the housings of the headphones are positioned in the vicinity of the ears which are on the sides of the face, and the headband comes into contact with the top of the head, the user is not able to see the input unit. Therefore, it is difficult to adopt a touchpad to which input is only able to be performed by looking as an input device provided in the headband or the housings of headphones.

In addition, even if physical buttons are provided on the housings or the headband of headphones as input devices, when the headphones are equipped, since it is not possible to see the housings or the headband, it is not possible to see the physical buttons either. Therefore, even if the provided buttons are physical buttons, it may be necessary that the user searches for the buttons by feeling when performing an input. Furthermore, in a case when a plurality of physical buttons is provided, it may be necessary to judge the types of the physical buttons based on information on the positions, shapes, sizes, and the like of the physical buttons obtained from the feel of the fingers. It is therefore difficult to adopt a touchpad in which there are no individual physical buttons as an input section.

It is desirable to provide an input device in which a user is able to perform an intuitive input operation without having to look.

According to an embodiment of the disclosure, there is provided an input device of an electronic apparatus including: an input detection unit which is provided on the electronic apparatus at a position that is difficult to be seen by a user who uses the input device, and which detects an input operation of the user; a movement distance detection unit that detects a movement distance of an input position over the input detection unit; and an action control unit that controls a predetermined action of the electronic apparatus based on the movement distance detected by the movement distance detection unit.

According to another embodiment of the disclosure, there is provided an input device of an electronic apparatus including: an input detection unit that detects an input operation of a user; a movement distance detection unit that detects a movement distance of an input position over the input detection unit; an action control unit that controls a predetermined action of the electronic apparatus based on the movement distance detected by the movement distance detection unit; a lock setting unit that invalidates an operation input to the input detection unit; a lock releasing unit that releases a lock by the lock setting unit; and a lock release input unit that receives input for causing the lock releasing unit to act.

According to the embodiments of the disclosure, the user is able to perform a variety of input operations to an input device without looking.

BRIEF DESCRIPTION OF THE DRAWINGS

FIGS. 1A and 1B are diagrams illustrating an appearance configuration of headphones that include an input device according to an embodiment of the disclosure;

FIG. 2 is a block diagram illustrating a configuration of headphones that include the input device according to an embodiment of the disclosure;

FIG. 4 is a flowchart illustrating the flow of processes of an input operation;

FIG. 5 is a flowchart illustrating the flow of processes of the input device;

FIGS. 7A and 7B are appearance configuration diagrams of headphones illustrating a second modified example of the dividing units of the input device according to an embodiment of the disclosure.

DETAILED DESCRIPTION OF EMBODIMENTS

Figure 3C:
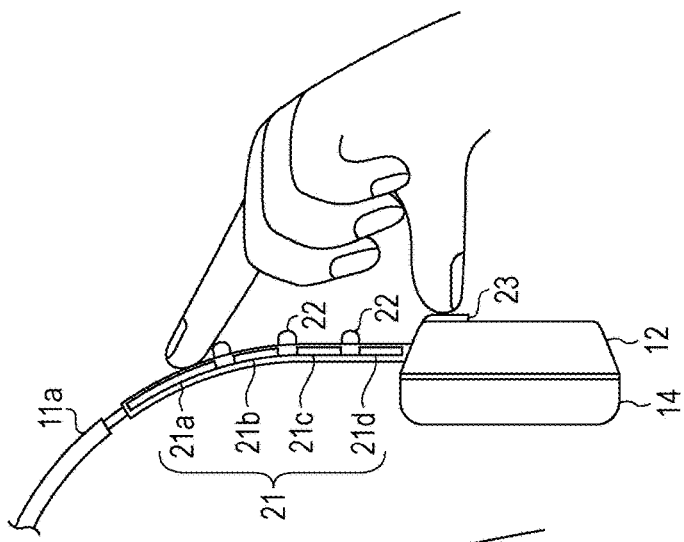
FIGS. 3A to 3C are diagrams illustrating the actions of the fingers of a user when performing an input operation to the input device.

The embodiments of the disclosure will be described below with reference to the drawings. Here, the description will be given in the following order.
1. Embodiments
1-1. Configuration of Headphones Including Input Device
1-2. Input Operation and Action Control Performed Corresponding to Input
2. Modified Examples
1. Embodiments
1-1. Configuration of Headphones Including Input Device FIGS. 1A and 1B are diagrams illustrating an appearance configuration of headphones 1 that include an input device according to an embodiment of the disclosure. FIG. 1A is a front view and FIG. 1B is a left side view. The headphones 1 include a headband 11, a left housing 12, a right housing 13, a left earpad 14, and a right ear pad 15. A touch sensor 21 as an input detection unit that configures the input unit, protrusions 22, 22, . . . as dividing units, and a lock release button 23 are further included. Furthermore, a power button 24 and a pairing button 25 are included.

In the embodiment, the headphones 1 are used by being connected to a sound reproduction device that is able to reproduce sound data such as an MP3 (MPEG Audio Layer-3), a WAV (RIFF waveform Audio Format), or the like, a mobile phone, a smartphone (none shown in the drawings. Hereinafter, referred to as a sound reproduction device or the like), or the like. Further, the headphones 1 are an apparatus that is able to transceive data by near field communication of the Bluetooth protocol. In the embodiment, the headphones 1 are connected to the sound reproduction device or the like by the Bluetooth protocol. The sound reproduction device or the like functions as the Bluetooth master and the headphones 1 function as the slave.

The headband 11 is formed in a curved shape to follow the head of the user, and when equipped, supports the entirety of the headphones 1 by being in contact with the top of the head of the user. The headband 11 is configured using synthetic resins such as plastics, metals, or the like, and is endowed with flexibility by having predetermined hardness and elasticity. The state of the headphones 1 being worn is thus able to be maintained, when equipping, by the left earpad 14 and the right earpad 15 being pushing out in directions to the sides of the head of the user. Here, rubber or the like may be provided to the portion on the inside face of the headband 11 that comes into contact with the top of the head of the user as cushioning. Further, a hinge may be provided in the central portion for folding up when being carried.

The headband 11 is configured to include a slider structure. In the embodiment, the headband 11 includes a central band portion 11a that contacts the top of the head of the user, and a left band portion 11b and a right band portion 11c that is connected to both ends of the central band portion 11a. The left band portion 11b and the right band portion 11c are formed to have a pipe shape, and are configured to be able to slide to and from the central band portion 11a by the central band portion 11a being inserted in the inner portions thereof. The left band portion 11b and the right band portion 11c are able to move upward or downward to or from the central band portion 11a. When the headphones 1 are equipped, the left housing 12, the right housing 13, the left earpad 14, and the right earpad 15 are able to be fitted to positions facing the ears of the user by adjusting the lengths of the left band portion 11b and the right band portion 11c to suit the size of the head of the user or the distance between the ears and the top of the head. In so doing, the user is able to obtain an equipping feel according to their own physical features and preferences.

Here, the touch sensor 21 as an input detection unit that detects an input operation by the user is provided to the headband 11. Details of the touch sensor 21 will be described later.

The left housing 12 is provided at the front end of the left band portion 11b of the headband 11. Further, the right housing 13 is provided at the front end of the right band portion 11c of the headband 11. The left housing 12 and the right housing 13 function as accommodation units that internally accommodate sound processing circuits, speakers, control circuits for control of the actions of the input device, and the like.

The left housing 12 and the right housing 13 are formed, for example, using a synthetic resin such as plastics. The sound processing circuit performs, for example, predetermined sound signal processing such as noise cancelling processing, signal amplification processing, equalizing processing, and the like to sound signals that drive the speakers. The speakers are sound output sections that output sound signals, on which processing is performed by the sound processing circuit, as sound.

The left earpad 14 and the right earpad 15 are formed to have elasticity by covering materials with elasticity such as urethane foam, cotton, synthetic fibers, or the like with synthetic leather or the like. Further, the left earpad 14 is provided on the surface of a side of the left housing 12 that faces the side of the head of the user. Similarly, the right earpad 15 is provided on the surface of a side of the right housing 13 that faces the side of the head of the user. The left earpad 14 and the right earpad 15 function as buffer members between the housings and the sides of the head of the user by being interposed between the left housing 12 and the right housing 13 and the sides of the head of the user. That is, the left earpad 14 and the right earpad 15 are for preventing the housings formed with hard materials that are not easily deformed from directly touching the sides of the head of the user when the headphones 1 are equipped and causing discomfort or pain to the user.

In addition, the left earpad 14 and the right earpad 15 also serve the purpose of attempting to improve sound quality such as improving the reproducibility of lower registers, by sealing the space formed between the earpads and the sides of the head of the user. Further, the left earpad 14 and the right earpad 15 serve the purpose of preventing the sound output from the speakers from leaking to the outside.

Here, hangers (not shown in the drawings) are provided on both ends of the headband 11, and the left housing 12 and the right housing 13 may be respectively connected to the hangers to be rotatable. For example, the hangers support the housings to be rotatable by pivotally supporting them with support pins (not shown in the drawings), each of which protrudes inward from both ends. In this manner, when the headphones 1 are equipped, since the orientations of the housings change to suit the shapes of the surroundings of the ears of the user, the housings and the earpads are able to be made to face the ears in a state that is suitable for the shapes of the sides of the head of the user.

The touch sensor 21 is provided on the left band portion 11b of the headband 11. The touch sensor 21 includes a first sensor 21a, a second sensor 21b, a third sensor 21c, and a fourth sensor 21d. The first sensor 21a, the second sensor 21b, the third sensor 21c, and the fourth sensor 21d correspond to a plurality of regions of the input detection unit within the scope of the claims. The first sensor 21a, the second sensor 21b, the third sensor 21c, and the fourth sensor 21d are plate-shaped sensors, and are touch sensors of a capacitive type in which whether or not a finger of the user is in contact is detected by miniscule changes in the capacitance. In the embodiment, the user performs an input by bringing a finger into contact with the touch sensor 21 and sliding the finger.

The first sensor 21a, the second sensor 21b, the third sensor 21c, and the fourth sensor 21d are lined up along the longitudinal direction of the headband 11 on the upper surface of the left band portion 11b of the headband 11. Further, the first sensor 21a, the second sensor 21b, the third sensor 21c, and the fourth sensor 21d are lined up with gaps of predetermined widths therebetween. In this manner, in an embodiment of the disclosure, although the user is easily able to ascertain the position of the touch sensor 21 intuitively, the touch sensor 21 is provided in a position that is difficult to see. Here, although the second sensor 21b, the third sensor 21c, and the fourth sensor 21d are configured to be substantially the same size, the first sensor 21a provided at the top is configured so that its dimension in the vertical direction are large compared to the other sensors. In so doing, even a user with large hands performing an input operation with the fingers spread apart does not touch portions other than the touch sensor 21 on the headband 11. Since the fingers do not come into contact with portions other than the touch sensor 21 even if the fingers are spread apart wide and it is possible to bring the fingers into contact with the touch sensor 21 immediately after beginning the input operation, activation of the input device is able to be performed quickly.

As the touch sensor 21, it is also possible to use a touch sensor that uses other types such as a resistive pressure-sensitive type. However, the touch sensor is pressed down when performing an input to a resistive pressure-sensitive touch sensor. In an embodiment of the disclosure, since an input is performed by sliding a finger on the touch sensor 21, if the touch sensor 21 is pressed down for inputting, the user slides the finger while maintaining the state of pressing down on the touch sensor 21. It is therefore considered preferable to use a capacitive type touch sensor, in which there is no pressing down when performing input, as the touch sensor 21. With a capacitive type touch sensor, since input is able to be performed by merely bringing a finger into contact, an input operation is able to be performed easily.

The protrusions 22, 22, . . . are provided to protrude outward in positions corresponding to the gaps that exist between each of the first sensor 21a, the second sensor 21b, the third sensor 21c, and the fourth sensor 21d that configure the touch sensor 21. The protrusions 22 correspond to the dividing units within the scope of the claims. By respectively providing a protrusion 22 between the first sensor 21a, the second sensor 21b, the third sensor 21c, and the fourth sensor 21d, the touch sensor 21 is divided into four regions. By providing the protrusions 22, since the finger touches the protrusions 22 when a finger is slid over the touch sensor 21, the user is able to intuitively ascertain the movement distance of their own finger over the touch sensor 21 by the number of protrusions 22 that are touched.

Here, in order for the user to be able to intuitively ascertain the movement distance of their own finger over the touch sensor 21 and the sliding of the finger over the touch sensor 21 is not obstructed, it is preferable that the protrusions 22 be formed to be, for example, roughly a few millimeters in height. Further, in order that the sliding of the finger is not obstructed, it is preferable that the protrusions 22 be formed as round-faced protrusions.

The lock release button 23 is provided at the top end of the outer surface of the left housing 12. The lock release button 23 is configured using a physical button. In the embodiment, ordinarily, the touch sensor 21 is in a so-called locked state in which even if a finger is brought into contact and an input operation is performed, processing according to the input operation is not performed. In this manner, an action that is not intended by the user due to a finger being unintentionally brought into contact with the touch sensor 21 is prevented. If an input is performed to the lock release button 23, the lock on the touch sensor 21 is released according to the control of a lock releasing unit 31e described later, and the touch sensor 21 enters a state in which input is possible. The lock release button 23 uses a so-called automatic recovery type button in which an input signal is output while the pressing down of the lock release button 23 is continued, and the lock released state of the touch sensor 21 is maintained.

The lock release button 23 is configured by a physical button such as, for example, a tact switch. However, the lock release button 23 is not limited to physical buttons, and may be configured using, similarly to the touch sensor 21, a capacitive type touchpad. In a case when a touch sensor is used, the lock is released by bringing a finger into contact with the lock release button 23.

The power button 24 and the pairing button 25 are provided on the outer surface of the right housing 13. The power button 24 and the pairing button 25 are configured as physical buttons. The power button 24 is a button for switching between the ON and OFF states of the power of the headphones 1. The pairing button 25 is a button for executing a pairing mode in which pairing is performed between the sound reproduction device or the like that is the master according to the Bluetooth protocol and the headphones 1 that are the slave according to the Bluetooth protocol. Pairing is processing to set each of two apparatuses as the target of the other for transceiving of data and the like. In the embodiment, pairing is executed by exchanging the respective IDs (identification information) and the passkeys (private code) between the headphones 1 and the sound reproduction device or the like. The ID is an address that is able to respectively specify the headphones 1 and the sound reproduction device or the like, and the passkey functions only in a case when the private codes set by each of the two devices are the same.

The appearance configuration of the headphones 1 is as described above. Next, an internal configuration of the headphones 1 will be described. FIG. 2 is a block diagram illustrating the internal configuration of the headphones 1 that include the input device.

The headphones 1 include a control unit 31, a bus 32, a RAM (Random Access Memory) 33, a ROM (Read Only Memory) 34, an SPI (Serial Peripheral Interface) 35, a parallel I/O interface 36, a UART (Universal Asynchronous Receiver Transmitter) interface 37, and a battery 38.

A touch sensor controller 39 is connected to the SPI 35. The first sensor 21a, the second sensor 21b, the third sensor 21c, and the fourth sensor 21d that configure the touch sensor 21 are connected to the touch sensor controller 39. Further, the lock release button 23, the power button 24, and the pairing button 25 are connected to the parallel I/O interface 36. Furthermore, a Bluetooth module 40 is connected to the UART interface 37. An antenna 41, an L channel speaker 42, and an R channel speaker 43 are connected to the Bluetooth module 40.

The control unit 31 is a CPU (Central Processing Unit), for example, that performs predetermined processing. The RAM 33 is used as a working memory of the control unit 31. Programs that are read and operated by the control unit 31 and the like are stored in the ROM 34. The control unit 31 is connected to the RAM 33 and the ROM 34 via the bus 32, and performs control of the entirety of the headphones 1 by executing a variety of processing according to the programs stored in the ROM 34 and performing issuance of commands. Further, the control unit 31 also functions as a movement distance detection unit 31a, a contact time measuring unit 31b, an action control unit 31c, a lock setting unit 31d, and the lock releasing unit 31e by executing predetermined programs.

The movement distance detection unit 31a detects the movement distance of a finger of the user over the touch sensor 21. The detection method of the movement distance will be described later. The contact time measuring unit 31b is a timer that measures the time elapsed from the beginning of contact of a finger to the finger being moved away (end of contact), based on an input signal that indicates contact with the touch sensor 21 supplied from the touch sensor controller 39. The action control unit 31c controls the various actions of the headphones 1 based on the movement distance detected by the movement distance detection unit 31a and the contact time measured by the contact time measuring unit 31b. The specific contents of the action control will be described later.

The lock setting unit 31d performs control to set the touch sensor 21 to be in a locked state in which input operations by contact become invalid. In a case when the touch sensor 21 is in a locked state, even if an input operation is performed on the touch sensor 21 and an input signal is input to the control unit 31, there are restrictions such that processing according to such input operations are not performed by the programs executed by the control unit 31.

The lock releasing unit 31e releases the locked state set by the lock setting unit 31d by releasing the restrictions where processing corresponding to input operations are not performed in the programs executed by the control unit 31. If an input operation is performed on the touch sensor 21 in a state in which the lock is released, an action control corresponding to such an input is carried out by the action control unit 31c.

Here, the lock releasing unit 31e only functions in a case when an input is performed on the lock release button 23. As described above, the lock release button 23 uses the so-called automatic recovery type button that outputs a control signal while being pressed down. Therefore, the lock is constantly in a released state during periods in which the pressing down of the lock release button 23 is maintained. Further, when the pressing down of the lock release button 23 is ended (the finger is moved away from the lock release button 23), the touch sensor 21 is once again automatically set to be in a locked state by the lock setting unit 31d. However, without being limited to such an example, a lock released state may be maintained even after moving the finger away from the lock release button 23 after the lock release button 23 has been pressed, and a lock setting may be performed by pressing down on the lock release button 23 once again.

In addition, the locking and the releasing of the lock on the touch sensor 21 may be realized by providing a switch circuit (not shown in the drawings) between the SPI 35 and the touch sensor controller 39 and switching the switch circuit based on controls by the lock setting unit 31d and the lock releasing unit 31e. Further, locking may be performed by interrupting the control signals within the SPI 35 or the like.

The SPI 35 serves the purpose of a bus connecting the touch sensor controller 39 to the control unit 31. When a finger is brought into contact or moved away as the input actions to the first sensor 21a, the second sensor 21b, the third sensor 21c, and the fourth sensor 21d, the touch sensor controller 39 detects the contact or the moving away, and transmits a corresponding input signal to the control unit 31 via the SPI 35 and the bus 32. Further, processing corresponding to the input is performed by the action control unit 31c.

In an embodiment of the disclosure, a predetermined value (hereinafter referred to as an assigned value) is assigned to each of the first sensor 21a, the second sensor 21b, the third sensor 21c, and the fourth sensor 21d that configure the touch sensor 21. For example, the assigned values are "1" for the first sensor 21a, "2" for the second sensor 21b, "3" for the third sensor 21c, and "4" for the fourth sensor 21d.

In addition, the movement distance detection unit 31a calculates the difference between the assigned value of the sensor with which a finger first comes into contact at the beginning of an input to the touch sensor 21 and the assigned value of the sensor with which the finger is in contact last when the finger is moved away at the end of the input. In the embodiment, the difference between the assigned values represents the movement distance of the finger over the touch sensor 21.

For example, in a case when the finger is in contact with the fourth sensor 21d at the beginning of contact and the finger is in contact with the third sensor 21c last when moved away, the difference is 1. In a case when the finger is in contact with the third sensor 21c at the beginning of contact and the finger is in contact with the first sensor 21a last when moved away, the difference is 2. In a case when the finger is in contact with the fourth sensor 21d at the beginning of contact and the finger is in contact with the first sensor 21a last when moved away, the difference is 3. Here, the difference is calculated as a positive value in a case when the finger is slid upward.

Further, the difference is also calculated as a negative value. The difference is calculated as a negative value in a case when, in contrast to a case when a positive value is calculated, the finger is slid downward. In a case when the finger is in contact with the first sensor 21a at the beginning of contact and the finger is in contact with the second sensor 21b last when moved away, the difference is −1. In a case when the finger is in contact with the second sensor 21b at the beginning of contact and the finger is in contact with the fourth sensor 21d last when moved away, the difference is −2. In a case when the finger is in contact with the first sensor 21a at the beginning of contact and the finger is in contact with the fourth sensor 21d last when moved away, the difference is −3.

Furthermore, in a case when the sensor with which the finger is in contact at the beginning of contact and the sensor with which the finger is in contact last when moved away are the same, the difference is 0.

The contact time measuring unit 31b performs measurement of the time that elapses from when the finger comes into contact with, to when it moves away from, the touch sensor 21, that is, the time during which the finger is in contact with the touch sensor 21 (hereinafter, referred to as the contact time), based on an input signal, supplied from the touch sensor controller 39, that indicates the contact and the moving away of a finger with and from the touch sensor 21. The contact time measuring unit 31b corresponds to the input time measuring unit within the scope of the claims.

The action control unit 31c performs a comparison between the difference (movement distance) detected by the movement distance detection unit 31a and a predetermined threshold value, and performs various action controls according to the comparison result. Further, comparison between the contact time measured by the contact time measuring unit 31b and the predetermined time that is set in advance as the threshold value is performed, and action controls are also performed based on such a comparison result. Various actions are thus assigned to the comparison results between the respective values of the differences and the contact times.

The relationships between the differences and the actions in the embodiment are set to be "skip track" when "difference≥2" and "volume up" when "difference=1". Further, "stop reproduction" is when "difference=0" and the contact time is equal to or greater than a predetermined time, "pause" is when "difference=0" and the contact time is equal to or less than a predetermined time during music reproduction, and "reproduce" is when "difference=0" and the contact time is equal to or less than a predetermined time when the music is stopped. Further, it is "volume down" when "difference=−1" and it is "skip back track" when "difference≤−2". However, the above is only an example, the relationships between the differences and the actions are not limited thereto, and various other combinations are possible.

In this manner, in an embodiment of the disclosure, various action controls are not assigned to each of the first sensor 21a, the second sensor 21b, the third sensor 21c, and the fourth sensor 21d, but various actions are assigned to the relative movement distances of a finger. Therefore, for example, the action control that is performed in a case when the finger is slid from the second sensor 21b to the first sensor 21a (difference=1) is the same as the action control that is performed when the finger is slid from the fourth sensor 21d to the third sensor 21c (difference=1). The user is thus able to perform input operations without concern for the position of each sensor. Further, a user with large hands is able to perform input operations by the sensors provided near the top of the headband 11, while a user with small hands is able to perform input operations near the bottom of the headband 11 at positions close to the housings.

The parallel I/O interface 36 is connected to the control unit 31 via the bus 32. The lock release button 23, the power button 24, and the pairing button 25 are connected to the parallel I/O interface 36. The power button 24 is a button for switching between the ON and OFF states of the power of the headphones 1. The pairing button 25 is a button for executing the pairing mode that performs pairing between the sound reproduction device or the like that is the master according to the Bluetooth protocol and the headphones 1 that are the slave according to the Bluetooth protocol.

If an input is performed on each of the lock release button 23, the power button 24, and the pairing button 25, control signals corresponding to the inputs are generated and the control signals are output to the control unit 31 via the parallel I/O interface 36 and the bus 32. Further, by performing processing corresponding to the control signals at the control unit 31, actions corresponding to the various buttons are performed.

The battery 38 is for performing power supply to the entirety of the headphones 1, and, for example, a lithium-ion secondary battery is used. The battery 38 is chargeable using an external power source via a charging terminal (not shown in the drawings).

The Bluetooth module 40 is connected to the UART interface 37. The Bluetooth module 40 is a module that is able to transceive data by near field wireless communication of the Bluetooth protocol. Exchange of data with the sound reproduction device or the like that is an external Bluetooth apparatus, which is the master, is performed by the Bluetooth module 40. The antenna 41, the L channel speaker 42, and the R channel speaker 43 are connected to the Bluetooth module 40.

In a case when sound data is received from the sound reproduction device or the like that is an external Bluetooth apparatus, the Bluetooth module 40 receives the sound data transmitted from the sound reproduction device or the like by the antenna 41 and supplies the sound data to a built-in signal processing unit. Further, in the signal processing unit, a sound signal is generated by carrying out predetermined signal processing on the sound data and supplied to the L channel speaker 42 and the R channel speaker 43. In so doing, music or the like that is reproduced by the sound reproduction device or the like is output as sound from the L channel speaker 42 and the R channel speaker 43. The L channel speaker 42 is provided in the left housing 12 and the R channel speaker 43 is provided in the right housing 13.

1-2. Input Operation and Action Control Performed Corresponding to Input

The headphones 1 that include the input device according to an embodiment of the disclosure is configured as described above. Next, a method of inputting controls to the input device will be described based on FIGS. 3A to 3C. Here, before the input operation, the power of the headphones 1 is ON, the headphones 1 and the sound reproduction device or the like are connected by the Bluetooth protocol, and further, pairing with the sound reproduction device or the like is completed.

In the embodiment, as described above, communication for performing the seven actions of "reproduce", "stop", "pause", "skip track", "skip back track", "volume up", and "volume down" is performed from the headphones 1 toward the sound reproduction device or the like by an input on the touch sensor 21.

Figure 3B:
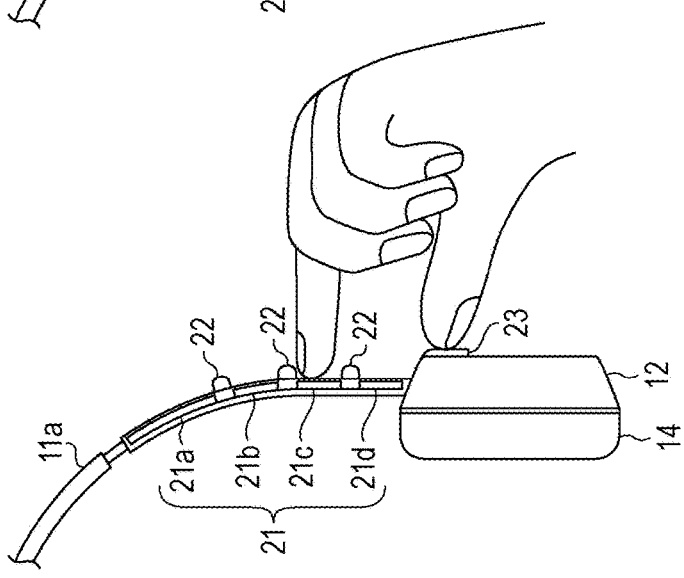
Figure 3A:
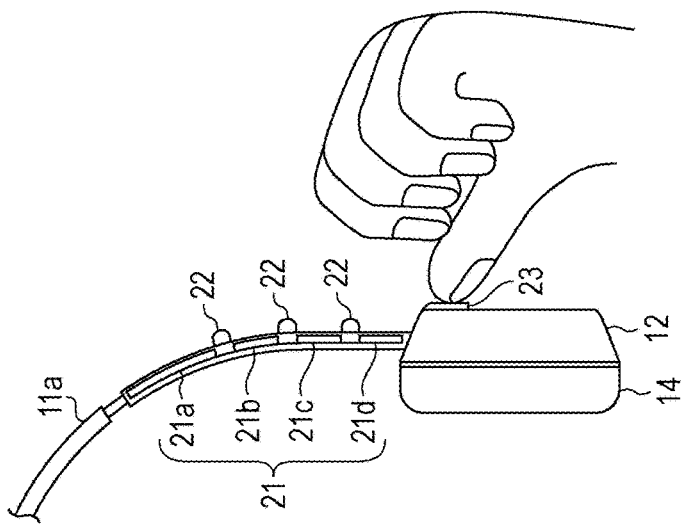

The touch sensor 21 is ordinarily in a locked state in which an action control is not carried out even if an input operation is performed. Therefore, firstly, as illustrated in FIG. 3A, the locked state of the touch sensor 21 is released by pressing down on the lock release button 23 using a thumb. Here, in the embodiment, the lock release button 23 uses the so-called automatic recovery type button in which the lock on the touch sensor 21 is only released while the lock release button 23 is pressed down. The user therefore presses down on the lock release button 23 while an input is performed on the touch sensor 21. However, in a case when it is configured such that the lock released state is maintained even after moving the finger away if the lock release button 23 is pressed down once, the thumb may be moved away from the lock release button 23 when inputting on the touch sensor 21.

Here, the thumb is not necessarily used for inputting to the lock release button 23. However, in order to bring other fingers into contact with the touch sensor 21 while maintaining the state of pressing down on the lock release button 23, due to the configuration of the human hand, it is preferable that an input to the lock release button 23 is performed using the thumb.

Next, while maintaining the state of pressing down on the lock release button 23 with the thumb, other fingers are brought into contact with the touch sensor 21. Here, in the embodiment, description will be given while assuming a case in which, as illustrated in FIGS. 3B and 3C, an input operation is performed using the index finger. However, the finger used for performing an input operation on the touch sensor 21 is not limited to the index finger, and input is also possible using other fingers such as the middle finger.

Further, the index finger is slid in the upward direction or the downward direction along the longitudinal direction of the headband 11 in a state in which the index finger is in contact with the touch sensor 21. Various action controls are performed according to the movement distance of the index finger by such sliding. With the sliding, there is a case in which the finger is slid upward so as to move from the state illustrated in FIG. 3B to the state illustrated in FIG. 3C, and conversely a case in which the finger is slid downward so as to move from the state illustrated in FIG. 3C to the state illustrated in FIG. 3B.

The input to the lock release button 23 and the action control based on the movement distance (difference of assigned values) of the index finger will be described with reference to the flowcharts of FIGS. 4 and 5. Such processing is performed by the control unit 31. First, in step S1, it is determined whether or not an input is made to the lock release button 23. In a case when it is determined that an input is made to the lock release button 23 in step S1 (Yes in step S1), next, in step S2, the locked state of the touch sensor 21 is released. Therefore, as long as it is determined in step S1 that an input is not made to the lock release button 23 (No in step S1), an action control is not performed even if a finger is brought into contact with the touch sensor 21.

Next, in step S3, it is determined whether or not the index finger is in contact with the touch sensor 21. In a case when the index finger is determined to be in contact with the touch sensor 21 in step S3 (Yes in step S3), next, in step S4, the difference of the assigned values is set to be 0. Further, next, in step S5, the contact time is set to 0, and measurement of the contact time is begun by the contact time measuring unit 31b in step S6. Here, the order of the steps S4 and S5 are not limited to the order described above, and is also able to be performed in reverse order.

Further, in step S7, it is determined whether or not the index finger has moved away from the touch sensor 21. As long as it is determined in step S7 that the index finger has not moved away from the touch sensor 21 (No in step S7), the measurement of the contact time by the contact time measuring unit 31b is continued. Furthermore, in a case when it is determined in step S7 that the index finger has moved away from the touch sensor 21 (Yes in step S7), the processing proceeds to step S8, the measurement of the contact time is stopped, and the contact time is calculated.

Next, in step S9, the difference between the assigned value of the sensor with which a finger first comes into contact at the beginning of an input to the touch sensor 21 and the assigned value of the sensor with which the finger is in contact with last when the finger is moved away at the end of the input is calculated by the movement distance detection unit 31a. As described above, the difference corresponds to the movement distance of the index finger that is slid over the touch sensor 21.

Next, in step S10, whether or not "difference≥2" is determined by the action control unit 31c. In the embodiment, a case in which "difference≥2" is when the difference is "2" or "3". Further, in a case when it is determined that "difference≥2" (Yes in step S10), the processing proceeds to step S11, and an action control for performing "skip track" is carried out. On the other hand, in a case when it is determined in step S10 that "difference≥2" is not the case, the processing proceeds to step S12 and it is determined whether or not "difference=1". In a case when it is determined that "difference=1" in step S12, the processing proceeds to step S13, and an action control for performing "volume up" is carried out.

In a case when it is determined in step S12 that "difference=1" is not the case, the processing proceeds to step S14, and it is determined whether or not "difference=0". In a case when it is determined that "difference=0" (Yes in step S14), the processing proceeds to step S15. Next, it is determined in step S15 whether or not the contact time is equal to or greater than a predetermined time (for example, 2 seconds) set in advance as a threshold value. Further, in a case when it is determined in step S15 that the contact time is equal to or greater than the predetermined time (Yes in step S15), the processing proceeds to step S16, and an action control for performing "stop reproduction" is carried out. Here, although 2 seconds has been given as an example of the predetermined time, the predetermined time is not limited to 2 seconds. The predetermined time may be set arbitrarily by the user.

On the other hand, in a case when it is determined in step S15 that the contact time is not equal to or greater than the predetermined time (No in step S15), the processing proceeds to step S17, and it is determined at that point whether or not the sound reproduction device or the like is performing reproduction. In a case when it is determined in step S17 that the sound reproduction device or the like is performing reproduction (Yes in step S17), the processing proceeds to step S18 and an action control for performing "pause" is carried out. Further, in a case when it is determined in step S17 that the sound reproduction device or the like is not performing reproduction (No in step S17), the processing proceeds to step S19, and an action control for performing "reproduction" is carried out.

The description is returned to step S14. In a case when it is determined in step S14 that "difference=0" is not the case (No in step S14), next, in step S20, it is determined whether or not "difference=−1". In a case when it is determined in step S20 that "difference=−1" (Yes in step S20), the processing proceeds to step S21, and an action control for performing "volume down" is carried out. On the other hand, in a case when it is determined in step S20 that "difference=−1" is not the case (No in step S20), the processing proceeds to step S22.

Further, it is determined in step S22 whether or not "difference≤−2". In the embodiment, a case in which "difference≤−2" is a case in which the difference is "−2" or "−3". In a case when it is determined that "difference≤−2" (Yes in step S22), the processing proceeds to step S23, and an action control for performing "skip back track" is carried out.

Here, the comparison determination between the differences and the threshold values in steps S10, S12, S14, S20, and S22 is not necessarily performed in the order described above. For example, the determination of whether or not "difference≤−2" or the determination of whether or not "difference=−1" may be performed first.

Each action control described above is performed by the action control unit 31c performing generation of action control signals that correspond to the various actions based on the differences and the contact times, and by the action control signals being transmitted via the antenna 41 to the sound reproduction device or the like from the Bluetooth module 40.

In the embodiment, the differences are comparatively determined against the five threshold values of "2", "1", "0", "−1", and "−2". It is determined whether or not the threshold values "1", "0", and "−1" are equal to the differences. However, with regard to the threshold value "2", it is determined not whether or not it is equal to the differences, but it is determined whether or not "difference≥2", and also with regard to the threshold value "−2", it is determined not whether or not the threshold is equal to the differences, but it is determined whether or not "difference≤−2".

The above is so that an intuitive input by the user is possible. For example, a case in which a different action control is each assigned to "difference=3", "difference=2", and "difference=1" is considered. In such a case, the user stops the sliding of the finger at an appropriate position, while checking how much distance their own finger has moved over the touch sensor 21 by the feel of the finger, such that the difference corresponds to the desired action. It is not possible to perform an intuitive input in such a fashion.

Accordingly, in an embodiment of the disclosure, it is determined whether or not the threshold values "1", "0", and "−1" are equal to the differences. In order to slide the finger such that the difference is "1" or "−1", since the finger is merely slid across one protrusion 22 (the sliding of the finger is stopped once one protrusion 22 is felt), an intuitive input is not prevented.

Furthermore, it is determined whether or not the threshold value "2" is "difference≥2", and whether or not the threshold value "−2" is "difference≤−2". In so doing, in a case when the difference is "2" or "3", since both are determined to be "difference2", the action controls performed as a result are the same. Similarly, in a case when the difference is "−2" or "−3", since both are determined to be "difference≤−2", the action controls performed as a result are the same. Thereby, since the user does not perform an input while checking how much distance their own finger has moved over the touch sensor 21, an intuitive input is able to be performed.

A more intuitive input is also possible by the combination of the direction in which the finger is slid and the assigned action control. For example, it is considered that sliding in the upward direction (sliding from the vicinity of the ear in a direction toward the top of the head) gives an impression of "rising", "moving to the next", or "moving forward" to the user. On the other hand, it is considered that sliding in the downward direction (sliding from a direction from the top of the head toward the vicinity of the ear) gives an impression of "falling", "returning back", or "moving backward" to the user. Therefore, in the embodiment, "volume up" and "skip track" are assigned to the upward sliding of the finger (the case when the difference becomes a positive value). On the other hand, "volume down" and "skip back track" are assigned to the downward sliding of the finger (the case when the difference becomes a negative value). In this manner, a more intuitive operation becomes possible.

Furthermore, it is considered that halting the finger on a spot without sliding over the touch sensor 21 gives an impression of "stopping" to the user. Therefore, in a case when an input operation is performed by the finger being brought into contact with, and then moved away without sliding over, the touch sensor 21, that is equivalent to a so-called tapping input, one of "stop reproduction", "pause", and "reproduce" is configured to be performed. A more intuitive operation also becomes possible in this manner.

In addition, in a case when listening to sound from the sound reproduction device or the like, there is a case in which the volume is finely adjusted according to the surrounding environment or the like. Further, since the change in volume from a single input in volume adjustment is small, in a case when changing the volume significantly, an input operation is repeatedly performed a number of times. Therefore, in the embodiment, an action control corresponding to "difference=1" is made to be volume up, and an action control corresponding to "difference=−1" is made to be volume down. Thereby, since it is sufficient for the sliding of the finger performed for volume adjustment to be a short distance, an input operation is able to be performed repeatedly a plurality of times over a short period of time, and volume adjustment is able to be performed easily.

However, the actions assigned to each difference and contact time are not limited to the examples described above. For example, a reproduction action may be performed by performing a double tap input. Further, the user may be able to arbitrarily set which action controls are assigned to each difference.

Further, the action controls using the differences and the action controls using the contact times may not necessarily be combined and used. For example, the actions that are able to be commanded by the input device are limited to the four actions of "reproduce", "stop", "skip track", and "skip back track", and "skip track" is assigned to "difference≥2", "reproduce" is assigned to "difference=1", "stop" is assigned to "difference=−1", and "skip back track" is assigned to "difference≤−2". In such a manner, an action control may be performed without using the contact times, based only on the differences.

According to an embodiment of the disclosure, even when the touch sensor 21 that receives inputs from the user is provided in a position that is difficult to see, input operations are able to be performed easily without having to visually check the position of the touch sensor 21. Therefore, for example, even in a situation where the line of sight is not able to be moved from a predetermined position, such as when driving a vehicle, input operations are able to be performed easily without moving the line of sight. Further, since the touch sensor 21 is not necessarily seen, it is also easily used by the visually impaired.

2. Modified Examples

Although an embodiment of the disclosure has been described specifically, the disclosure is not limited to the embodiment described above, and various modifications based on the technical ideas of an embodiment of the disclosure are possible.

In the embodiment, the protrusions 22 are provided as the dividing units for dividing the first sensor 21a, the second sensor 21b, the third sensor 21c, and the fourth sensor 21d that configure the touch sensor 21. In so doing, the user is able to intuitively ascertain the movement distance of their own finger over the touch sensor 21 by the feel of the protrusions 22 that the finger feels. However, the protrusions 22 are not necessarily provided for the user to intuitively ascertain the movement distance of the finger over the touch sensor 21.

Figure 6B:
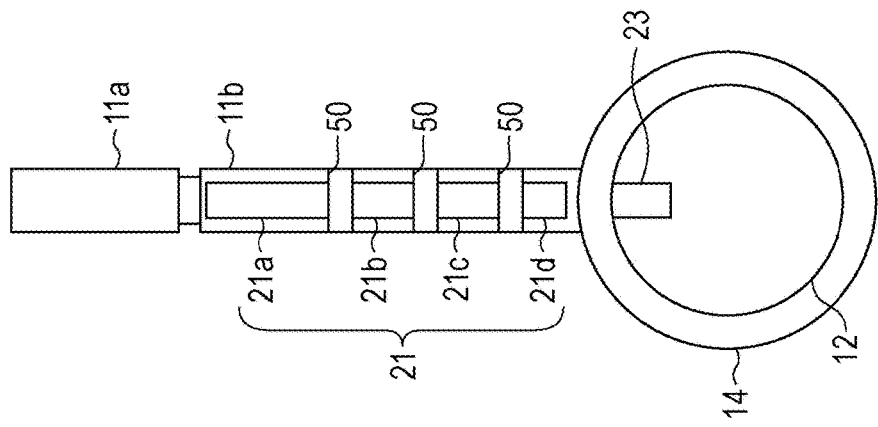
FIGS. 6A and 6B are appearance configuration diagrams of headphones illustrating a first modified example of dividing units of the input device according to an embodiment of the disclosure.
Figure 6A:
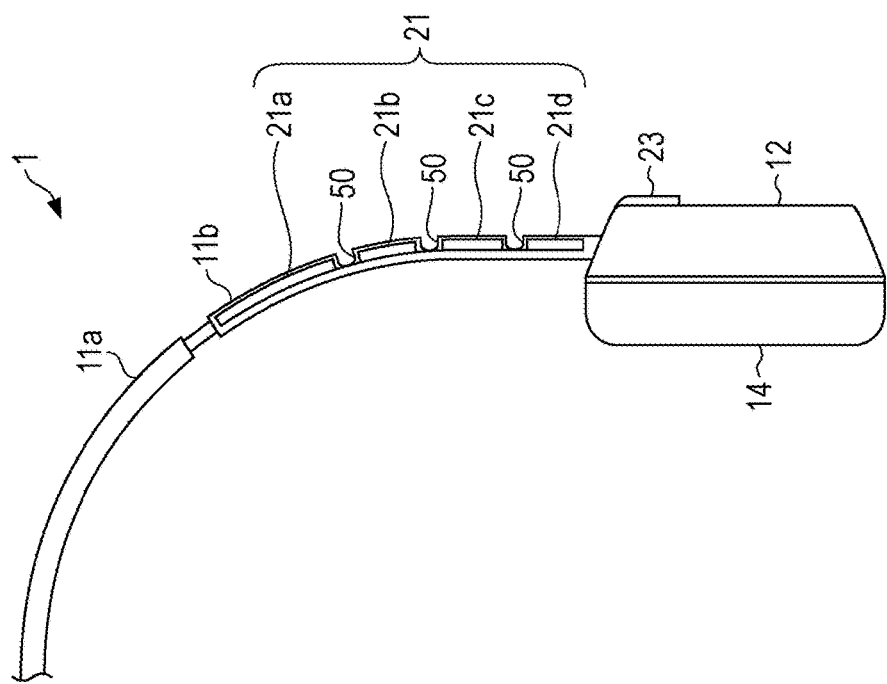

For example, as illustrated in FIGS. 6A and 6B, grooves 50, 50, . . . may be provided between each sensor so as to divide the first sensor 21a, the second sensor 21b, the third sensor 21c, and the fourth sensor 21d. Further, as illustrated in FIGS. 7A and 7B, rough surfaces 60, 60, . . . may be provided between each sensor so as to divide the first sensor 21a, the second sensor 21b, the third sensor 21c, and the fourth sensor 21d. By either method, when the user slides a finger over the touch sensor 21, by recognizing the grooves 50 or the rough surfaces 60 by the feel on the finger, the user is able to intuitively ascertain how much distance their own finger has slid over the touch sensor 21.

Figure 8:
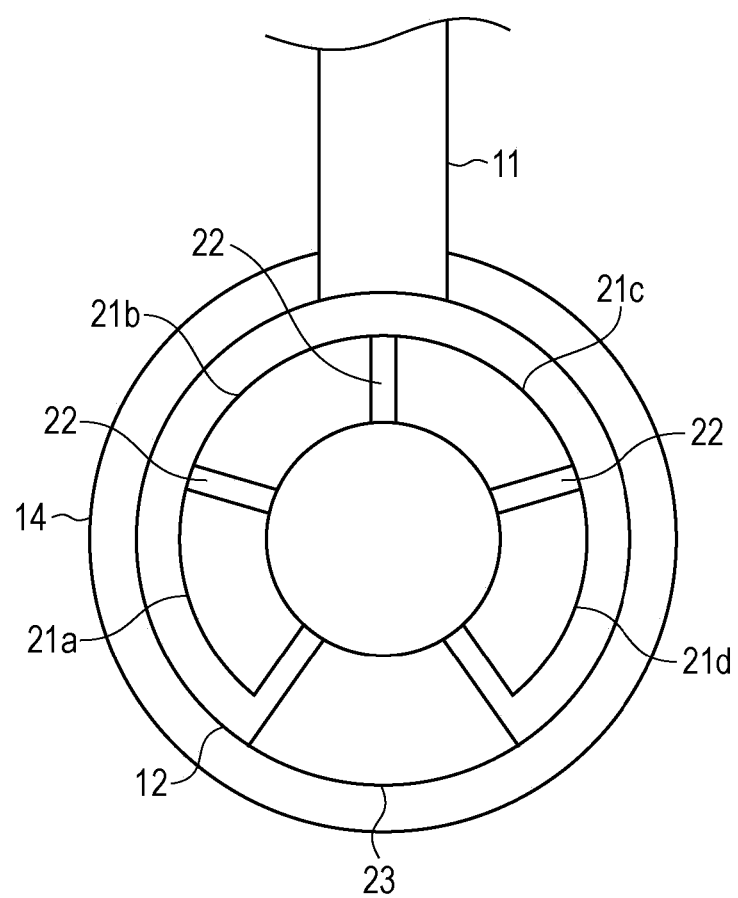
FIG. 8 is an appearance configuration diagram of headphones illustrating a modified example of a touch sensor of the input device according to an embodiment of the disclosure.

Furthermore, although the touch sensor 21 is provided on a side face of the headband 11 in the embodiment, the touch sensor 21 is able to be provided at other positions. For example, as illustrated in FIG. 8, the touch sensor 21 may be provided on an external face of the left housing 12 that configures the headphones 1. Since the housings are ordinarily formed to be a substantially circular shape in a side view, in the example of FIG. 8, the first sensor 21a, the second sensor 21b, the third sensor 21c, and the fourth sensor 21d that configure the touch sensor 21 are arranged in an annular pattern on the left housing 12. However, a plurality of sensors may be arranged so as to be lined up in one line in the vertical direction or the horizontal direction on the side face of the housing. Here, the touch sensor 21 may be provided not on the left housing 12 but on the right housing 13.

In the embodiment, although an example in a case when the touch sensor 21 is configured by a total of four sensors of the first sensor 21a, the second sensor 21b, the third sensor 21c, and the fourth sensor 21d has been described as an example, the number of sensors is not limited to four.

In addition, the touch sensor 21 as the input detection unit may be configured not by the individual sensors of the first sensor 21a, the second sensor 21b, the third sensor 21c, and the fourth sensor 21d, but by one touch sensor. In such a case, the touch sensor detects inputs made by contact with the operation surface, and coordinate data that indicates the contact positions is output from the touch sensor controller 39. In such a case, the movement distance detection unit 31a detects the movement distance of the finger based on the coordinate data output from the touch sensor controller 39.

Furthermore, the action controls assigned to the input operations are not limited to the examples given in the embodiment. For example, it is possible to assign various actions, such as performing switching of a plurality of playlists (lists on which the user collects desired track data in advance) created in the sound reproduction device or the like in advance, performing changes in the equalization settings, performing switching of the ON and OFF states of the power, and the like, that are performed by the headphones or the sound reproduction device or the like that is connected to the headphones. Further, in a case when the sound reproduction device or the like includes a radio function, switching of the action mode such as switching between a reproduction mode of sound data such as an MP3 or the like and a radio mode may be performed.

Furthermore, in case when an input device is provided on a so-called headset that is headphones including a microphone and the headset is connected to a mobile phone or a smartphone, action controls such as receiving of calls and ending of calls may be performed according to the input operations.

In addition, although only one predetermined time is set for a threshold value that is compared with a contact time in the embodiment, the predetermined time is not limited to one. For example, in a case when two predetermined times (2 seconds and 4 seconds) are set as the threshold values, and the contact time is equal to or greater than 4 seconds, action controls of "reproduce" or "pause" may be carried out, and in a case when the contact time is equal to or greater than 2 seconds and less than 4 seconds, an action control for "stop" may be carried out.

Furthermore, although the lock release button 23 is configured using a physical button in the embodiment, it may be configured using a touch sensor. In a case when a touch sensor is used, input methods such as releasing the lock when a finger is brought into contact with the touch sensor or releasing the lock by performing a predetermined action with the finger over the touch sensor are considered. Further, the lock release button 23 is not a prerequisite, and is not necessarily provided.

In addition, although an example in a case when the input device is applied to Bluetooth headphones has been described in the embodiment, the input device is able to be applied, other than the Bluetooth headphones, to headphones, noise cancelling headphones, surround headphones, and the like that are connected to the sound reproduction device or the like by a cord. Further, the input device is able to be provided in the housing of an electronic apparatus such as a mobile phone or a smartphone, and is able to be used as the input device of such an electronic apparatus itself.

The present disclosure contains subject matter related to that disclosed in Japanese Priority Patent Application JP 2010-223502 filed in the Japan Patent Office on Oct. 1, 2010, the entire contents of which are hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An electronic apparatus, comprising:
a continuous band, adapted to at least partially encircle a part of a user's body, the band comprising a first portion comprising a first end of the band, a second portion comprising a second end of the band, a slider structure, and a first surface, at least one of the first portion and the second portion being adapted for insertion into the slider structure, the first surface of the band residing between the first portion and the second portion and being adapted to contact the part of the user's body when the band at least partially encircles the part of the user's body;
a second surface, residing in a second plane substantially parallel to a first plane in which the first surface resides when in contact with the part of the user's body;
an input detector configured to detect touch input by the user on the second surface;
a movement detection unit configured to detect a movement distance and direction of the touch input along the second surface;
a transmitter configured to wirelessly transmit at least one first signal to a sound reproduction apparatus to initiate a connection between the electronic apparatus and the sound reproduction apparatus, and to transmit at least one second signal to the sound reproduction apparatus to control the sound reproduction apparatus; and
a receiver configured to wirelessly receive at least one third signal from the sound reproduction apparatus to establish the connection between the electronic apparatus and the sound reproduction apparatus;
wherein the transmitter is configured to wirelessly transmit as part of the at least one second signal an instruction to start or stop sound reproduction by the sound reproduction apparatus in response to receiving touch input of a user on the second surface.

2. The electronic apparatus according to claim 1, wherein the input detector is connected to the band.

3. The electronic apparatus according to claim 1, comprising:
  a lock setter configured to invalidate touch input to the input detector; and
  a lock releaser configured to release a lock set by the lock setter.

4. The electronic apparatus according to claim 1, comprising a power supply that is rechargeable via a charging terminal.

5. The electronic apparatus according to claim 1, wherein wireless transmission and reception by the transmitter and the receiver is performed using near field wireless communication.

6. The electronic apparatus according to claim 5, wherein the near field wireless communication employs a Bluetooth protocol.

7. The electronic apparatus according to claim 1, wherein the input detector is configured to detect a movement direction of the touch input along the second surface.

8. The electronic apparatus according to claim 1, wherein the input detector is configured to detect a double tap input.

9. The electronic apparatus according to claim 1, wherein the at least one first signal and the at least one third signal comprise address information for identifying the electronic apparatus and the sound reproduction apparatus.

10. The electronic apparatus according to claim 1, wherein the sound reproduction apparatus comprises a smartphone.

11. The electronic apparatus according to claim 1, wherein the input detector comprises a capacitive type touch sensor.

12. The electronic apparatus according to claim 1, wherein the electronic apparatus comprises a speaker configured to output a sound signal corresponding to a signal received by the receiver, and the speaker is disposed to output the sound signal in a direction orthogonal to the first plane.

13. The electronic apparatus according to claim 1, comprising a power button configured to switch the electronic apparatus between ON and OFF states.

14. The electronic apparatus according to claim 1, comprising: a housing comprising a speaker and a power button, the speaker being configured to output a sound signal according to a signal received by the receiver, the power button being configured to switch the electronic apparatus between ON and OFF states.

15. The electronic apparatus according to claim 2, wherein the band is adapted to at least partially encircle a user's head.

16. The electronic apparatus according to claim 1, wherein the second surface is disposed between the first end and the second end of the band.

* * * * *